United States Patent [19]
Loveless

[11] Patent Number: 5,434,610
[45] Date of Patent: Jul. 18, 1995

[54] METHODS AND APPARATUS FOR THE RECONFIGURATION OF CABLE TELEVISION SYSTEMS

[75] Inventor: Robert C. Loveless, Lawrenceville, Ga.

[73] Assignee: Scientific-Atlanta, Inc., Norcross, Ga.

[21] Appl. No.: 912,931

[22] Filed: Jul. 13, 1992

[51] Int. Cl.⁶ .............................................. H04N 7/10
[52] U.S. Cl. ........................................ 348/6; 455/4.1; 455/6.1
[58] Field of Search .................... 358/86; 455/3.1, 6.1, 455/6.2, 5.1, 4.1; 348/6, 12

[56] References Cited

U.S. PATENT DOCUMENTS 5,058,198 10/1991 Rocci et al. ........................ 358/86

OTHER PUBLICATIONS

Dujardin et al; ACEC Cable Television Equipment, (Jan. 1, 1978) ACEC Review (Belgium) No. 3-4, pp. 17-38.
R. C. Loveless, "Fiber to the Feeder—A Star Architecture" SCTE Fiber Optics Meeting 1-7 (Jan. 1991).
R. C. Loveless & J. A. Mattson, "A Fiber Optic Design Study", 1989 NCTA Technical Papers 114-17 (1989).
M. Pezarro, D. S. Lawson, & P. Harr, "Project Showcase: A Cable Architecture for the 90s" pp. 124-129.
"Intermediate/Terminating Trunk Module 450 MHz 234430; 550 MHz 34430" Scientific-Atlanta Products Brochure.
"Triax Product Overview", Jerrold Communications (Jan. 9, 1992).

Primary Examiner—Reinhard J. Eisenzopf
Assistant Examiner—Philip J. Sobutka
Attorney, Agent, or Firm—Banner & Allegretti, Ltd.

[57] ABSTRACT

A broadband cable television system for delivering broadband cable television signals from a headend to a plurality subscribers includes a bridger module. The bridger module allows upgrading of the system to a much higher channel capacity or to a fiber to the service area architecture with a minimum amount of subscriber down-time. The bridger module is advantageous in that it permits CATV systems to be reconfigured without having to relocate the trunk/bridger stations. The bridger module utilizes a signal director which is capable of directing broadband television signal flow from left-to-right or from right-to-left along a trunk cable. The bridger module also incorporates plug-in passive devices, the value of which is selected in accordance with the signal loss levels between independently located distribution amplifiers.

15 Claims, 6 Drawing Sheets

METHODS AND APPARATUS FOR THE RECONFIGURATION OF CABLE TELEVISION SYSTEMS

FIELD OF THE INVENTION

The invention pertains generally to methods and apparatus for the reconfiguration of CATV systems and is more particularly directed to methods and apparatus for coaxial system upgrades and coaxial to optical fiber conversions of CATV systems.

BACKGROUND OF THE INVENTION

In the past, broadband coaxial cable television systems have been designed with a system architecture known as "trunk and feeder". The function of a trunk coaxial cable is to deliver broadband television signals from a reception center, or headend, over the shortest distance with the least amount of amplification to a plurality of distribution points. The distribution points are connected to feeder coaxial cables which emanate from the trunk coaxial cable and contain subscriber tap off devices. At the distribution points, the feeders connect to the trunk at locations commonly termed trunk/bridger stations. Each trunk/bridger station has previously included a trunk amplifier for maintaining sufficient signal level through the trunk coaxial cable and a bridger amplifier for tapping off a portion of the trunk signal and distributing it to the feeders emanating from the trunk/bridger station. Because they are at the same location, the trunk amplifier and bridger amplifier have generally been contained within the same environmental housing. In coaxial trunk and feeder systems, the bridger locations (along with the headend and any hubs) are generally known as "star" focal points with the feeder cables emanating in all directions from them.

The locations of trunk/bridger stations along the trunk cable have been determined by the loss structure of the coaxial cable and the type of amplifier technology utilized. In general, the loss structure of the cable is determined by the channel loading of the particular cable television system. Coaxial cable in general appears as a distributed shunt capacitance along the length of a cable. Therefore, its loss characteristics vary with the length of the cable and the frequency of the signal. The longer the cable, the greater the attenuation, and the higher frequency, the greater the attenuation. With increases in channels more capacity has to be added at higher frequencies, and thus shorter distances between trunk amplifiers are necessary.

Many previous CATV systems in the industry were designed with a channel capacity of about 30–40 channels. Recently with the increase in available programming services, it has become desirable to upgrade these existing cable television systems to a much greater channel capacity, for example 60–80 channels. With these changes the loss structure of the cable varies from the original design which previously determined the locations of the trunk amplifier stations. A typical upgrade, from 30–35 channels (highest frequency 270–300 MHz) to 78 channels (highest frequency 550 MHz) requires that the trunk/bridger stations be relocated to compensate for the change in the loss structure of the system.

With regard to other types of reconfigurations, fiber optics have proven their ability to provide CATV systems with increased reliability and picture quality. Optical fibers have intrinsically more information carrying capacity than do the coaxial cables which are used in present CATV systems. In addition, optical fibers are subject to less signal attenuation per unit length than are coaxial cables adapted for carrying radio frequency signals. Consequently, optical fibers are capable of spanning longer distances between signal regenerators or amplifiers than are coaxial cable. In addition, the dielectric nature of optical fiber eliminates the possibility of signal outages caused by electrical shorting or radio frequency pickup. Finally, optical fiber is immune to ambient electromagnetic interference (EMI) and generates no EMI of its own.

There are numerous architectures in which optical fiber capability has been proven. These include the use of optical fiber as a fiber optic backbone and cable area networks. These CATV system builds have proved that such optical links are viable for CATV systems. However, both of these concepts are add-on layers developed for upgrading existing coaxial plants. But, while these optical fiber links have improved reliability and picture quality to the individual subscribers, they have also actually increased the electronics for the systems.

Recently a concept has evolved that, if an optical fiber could entirely replace a coaxial trunk system, then an entire layer of electronics could be eliminated thereby truly increasing reliability and lowering the cost associated with a major rebuild program. This concept is essentially what is termed "fiber to the feeder" (FTF) and in its simplest form envisions the replacement of the coaxial trunk system with optical fiber to what was a bridger location. The major problem with a fiber to feeder system is economics.

In answer to the high cost of fiber to the feeder systems, a new concept of "fiber to the service area" (FTSA) is now being implemented. Instead of running a trunk optical fiber to each distribution point, a number of distribution points in an immediate geographic area are grouped into a service area. The service area, rather than being geographically coextensive, could be to "pockets" of subscribers which require a specialized service, or for other reasons. The service area is then fed by an optical fiber trunk. This allows a rebuild of a system which increases channel capacity while using a new fiber optic backbone and not increasing cost.

In all present reconfiguration or rebuilding programs, whether merely for channel capacity upgrades, fiber to the feeder service, or for fiber to the service area, the distribution stars or bridger locations have to be moved. This is enormously expensive and it would be extremely advantageous to provide a system in which existing bridger locations could be maintained while taking advantage of these new technologies.

SUMMARY OF THE INVENTION

Therefore, it is an object of the invention to provide a bridger module which can be substituted for a trunk amplifier and which can be easily installed in a trunk/bridger station environmental housing.

It is another object in the invention to provide a bridger module which is capable of bidirectional trunk signal flow via a signal director.

It is yet another object of the invention to provide a bridger module which is adapted to easily vary the trunk signal through loss of a trunk/bridger station.

It is a further object of the invention to provide a method for reconfiguring CATV systems without having to relocate existing trunk/bridger stations.

It is a still further object of the invention to provide an upgraded CATV architecture for CATV systems which can be accomplished without having to relocate existing trunk bridger stations.

The invention provides novel methods and apparatus which can be used to reconfigure or upgrade a standard trunk and feeder architecture without the necessity of relocating any previous trunk/bridger stations. The invention is particularly useful in reconfigurations for upgrades which increase channel capacity and fiber to the service area conversions.

The invention includes a bridger module for replacing an existing trunk amplifier and which can mount directly in the environmental housing of a trunk/bridger station. The bridger module includes a through path for coupling a broadband television signal through the module without substantial attenuation and a variable loss path for coupling a selected portion of the signal to a bridger amplifier of the trunk/bridger station. The level of the selected portion coupled to the bridger amplifier is based on the location of the bridger station in the reconfigured CATV architecture. The invention also provides for a number of distribution amplifiers which can be located at predetermined spaced intervals along the trunk cable to provide gain for the reconfigured trunk segment in question.

This produces a configuration in which the bridger amplifier is independent of the trunk amplifier and the bridger module installs in a standard trunk/bridger environmental housing. The bridger module is flexible in determining the trunk signal through loss and is configured for bidirectional signal flow via a signal director in the event that the reconfigured system has to redirect signal flow opposite to the existing path. The trunk signal amplification is now separated from the bridger amplification and is accomplished by the new distribution amplifiers positioned as needed. The configuration maintains the existing bridger amplifier to feeder tie points and allows system reconfigurations to occur quickly and without great cost.

BRIEF DESCRIPTION OF THE DRAWINGS

These and other objects, features, and aspects of the invention will be more clearly understood and better described if the following detailed description is read in conjunction with the appended drawings wherein.

DETAILED DESCRIPTION OF THE INVENTION

Figure 1:
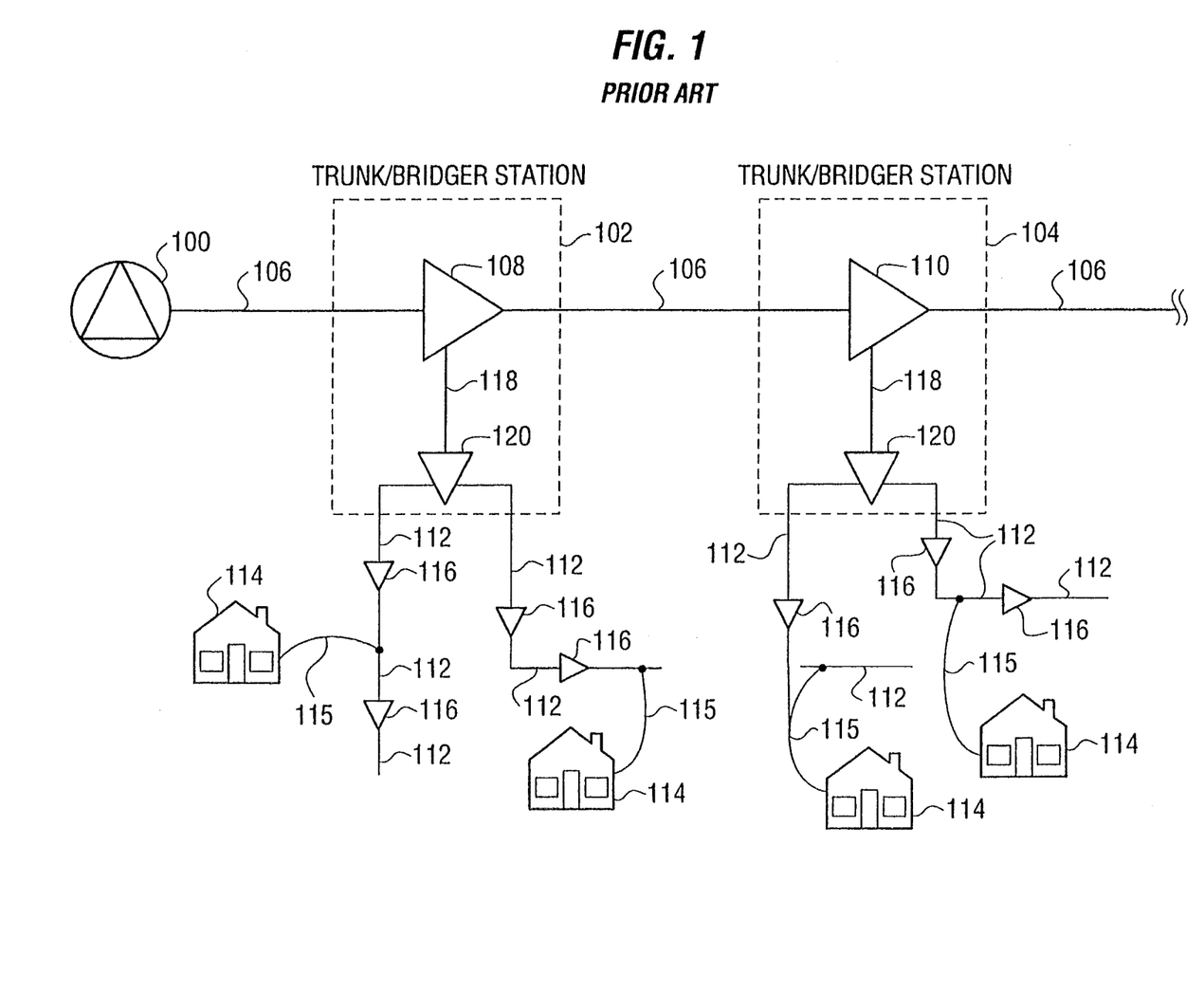
FIG. 1 is a system block diagram of a prior art cable television system illustrating a trunk and feeder architecture.

Referring to FIG. 1, there is shown a prior art cable television system having a "trunk and feeder" type architecture. The system includes a headend or hub 100 which comprises a source of television programming. The source of television programming may be a satellite receiver, a microwave or broadcast television link, a cable television link, or any other source of television programming consistent with the present invention. The headend or hub 100 transmits broadband cable television signals to plurality of trunk/bridger stations 102, 104 via a coaxial trunk cable 106. System or trunk amplifiers 108, 110 are spaced along the trunk cable 106 at the trunk/bridger stations 102, 104 to compensate for signal attenuation along the cable. The trunk cable 106 and trunk amplifiers 108, 110 are configured so that the broadband television signal gain along the trunk cable runs remains substantially constant, usually at unity gain. The trunk cable runs can be made as long as necessary or until the signal to noise ratio becomes too low for the trunk signal to meet the designed standards of the system. The location of each trunk/bridger station is determined when the cable system is initially built and based upon the necessary spacing of the trunk amplifiers for the channel frequencies for which the system is designed.

At each trunk/bridger station 102, 104, part of the broadband television signal passed through the trunk cable 106 is split off and coupled to a bridger amplifier 120 via feeder line 118. A plurality of coaxial cable feeders 112 extend from the bridger amplifier 120 and bring the television signal, via cable drops 115, to subscriber premises 114. Line extender amplifiers 116 are located along the feeder cables 112 to compensate for signal loss along the feeders.

In general, for a typical CATV system there may be a multiplicity of feeders tied to each bridger amplifier 120 and the stations become star focal points for the system. This installed base of feeder connections comprises a substantial part of the system and much of the original installation cost. Reconfiguration which require the repositioning of these feeder tie points are extremely expensive and should be avoided if at all possible.

Figure 2:
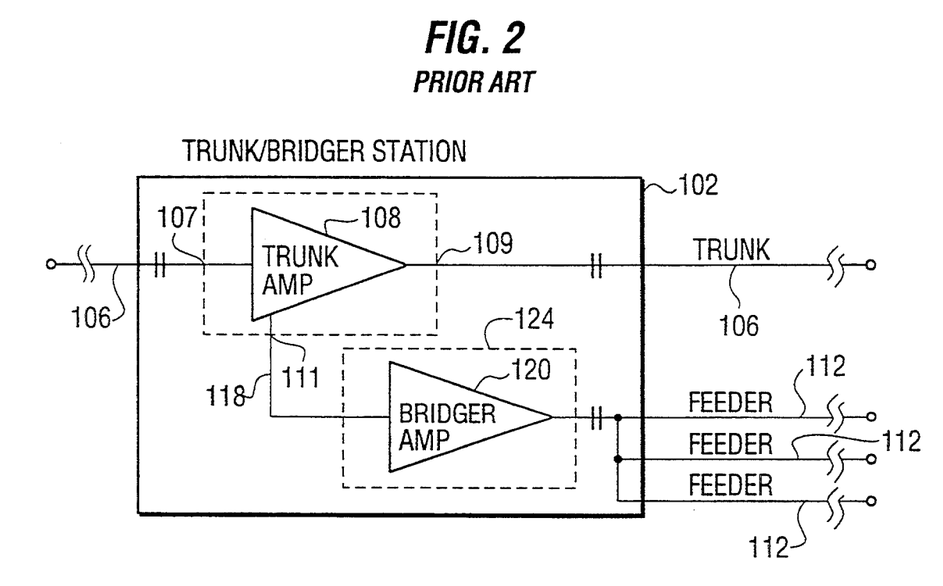
FIG. 2 is an electrical schematic diagram of the environmental housing of a prior art trunk/bridger station containing a trunk amplifier and a bridger amplifier.

FIG. 2 shows a standard trunk/bridger station, such as the one illustrated as 102, which contains a trunk amplifier 108 and a bridger amplifier 120. The trunk amplifier 108 is essentially contained on a single printed circuit card 122 which is connected to the coaxial trunk cable 106 via an input connector 107 and an output connector 109. The trunk amplifier 108 is similarly connected to a coaxial feeder line 118 at an output connector 111. The printed circuit board 122 can be replaceably removed to insert another trunk amplifier 108 or the bridger module of the present invention.

The trunk/bridger station 102 further comprises an environmental housing which contains the printed circuit boards of the trunk amplifier 122 and bridger amplifier 124. Inside of the trunk/bridger station, a section of the trunk cable can be removed to mount the environmental housing of the station. This results in a physical cable splice on either end of the environmental housing for the trunk amplifier 108 and a one physical cable splice for each coaxial cable feeder 112 which emanates from the bridger amplifier 120. In accordance with one of the objects of the invention, a CATV system can be reconfigured to either a higher channel capacity system or to a fiber to the service area architecture without disturbing the physical cable splices of the trunk/bridger station 102. The environmental housing of the trunk/bridger station is left in its originally designed place thereby saving the investment that has been made for that distribution star.

Figure 3:
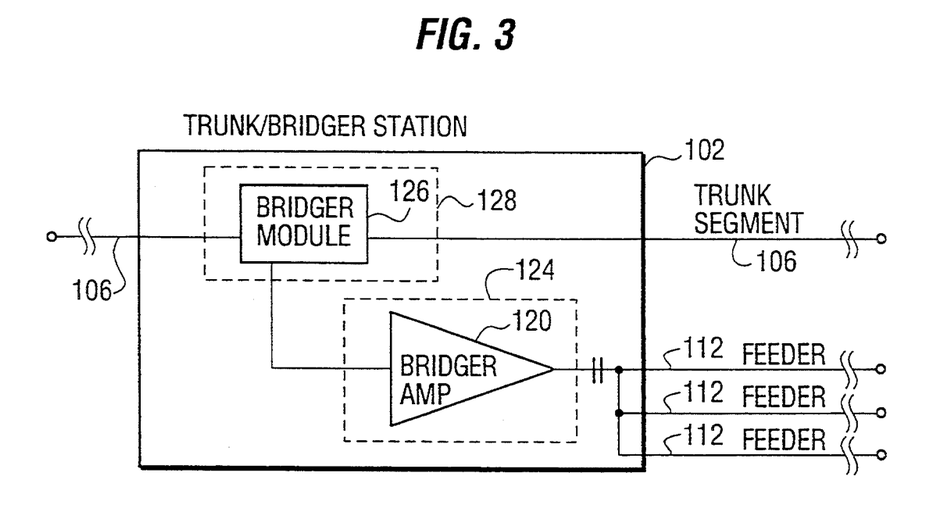
FIG. 3 is an electrical schematic diagram of the environmental housing of the trunk/bridger station illustrated in FIG. 2 containing a bridger module constructed in accordance with the invention and a bridger amplifier.

In FIG. 3, it is seen that a bridger module 126 which is incorporated on a single printed circuit board 128 can replace the printed circuit board 122 of the trunk amplifier. This produces an important part of an upgrade merely by replacing one circuit board with another while retaining the substantial investment of the feeder structure. Further, the change can be made without disturbing the physical splices of the trunk cable and the feeder cables. The bridger amplifier 120 and a bridger module 126 are now housed in a standard trunk/bridger station environmental housing which is located at each station, for example, the one referenced as 102 in the figure.

Figure 4:
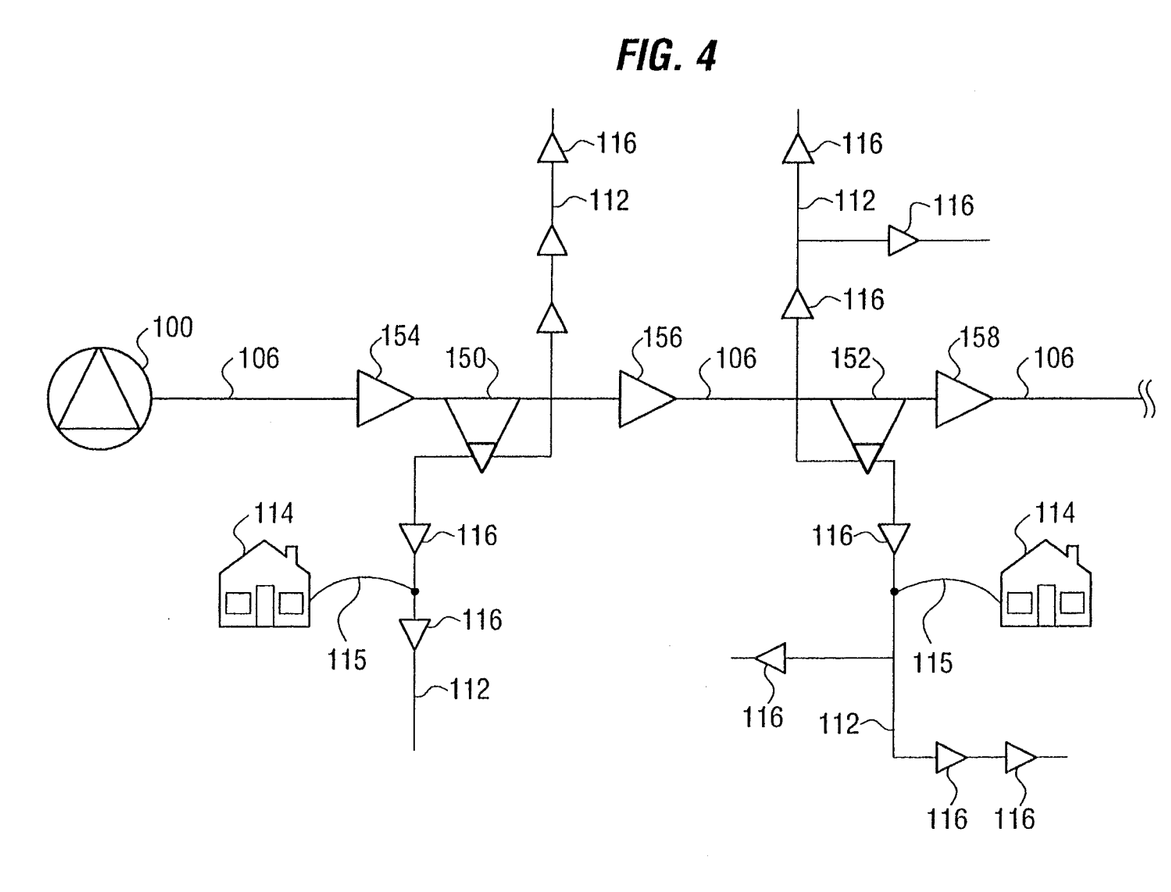
FIG. 4 is a system block diagram of a cable television system for distributing broadband cable television signals from a headend to a plurality of subscribers which is constructed in accordance with the invention illustrating a trunk and feeder architecture which has been upgraded to increase channel capacity.

FIG. 4 illustrates a system block diagram of an upgraded CATV system using the bridger module 126. The headend 100 and the trunk cable 106 are upgraded to supply additional channel capacity, for example, by upgrading the supporting equipment from 35 channels to 78 channels. This upgrade increases the highest frequency at which broadband television signals are transmitted, i.e., from about 330 MHz to about 550 MHz. Accordingly, a trunk cable 106 now runs between a plurality of bridger stations 150 and 152. The bridger stations 150 and 152 are so called because they no longer contain a trunk amplifier, but only a bridger module and a bridger amplifier as illustrated in FIG. 3.

At various locations along the trunk cable 106, a plurality of distribution amplifiers 154, 156, and 158 are provided. For example, if the upgrade is from 35 channels to 78 channels, a shorter spacing between trunk signal amplification is required. The distribution amplifiers are trunk grade signal amplifiers which are designed for increased channel capacity. However, they can be much simpler than the standard trunk amplifier which may include standard circuitry for tapping a portion of the broadband signal from the trunk signal. Standard trunk amplifiers may also include reverse signaling circuits and status monitoring circuits, in addition to conditioning circuits which control the level and frequency response of the signal delivered to the bridger amplifier. The distribution amplifiers in the present illustrated embodiment can be high grade signal amplifiers which have reverse path amplifiers contained therewith but not significant other complex circuitry.

It is seen that the distribution amplifiers 154 and 156 have a bridger station 150 located between them, which station can be located at any position between the spaced amplifiers. According to one aspect of the invention, the bridger module allows a variable through loss for the trunk signal to provide the correct signal level to the bridger amplifier for distribution over the feeder network. It is also noted that the reconfigured system shown in FIG. 4 has the signal direction going from the headend 100 toward the right side of the figure. According to another aspect of the invention, the bridger module 126 is bidirectional and can be used in case the signal direction from the headend 100 needs to be reversed along a trunk run or even along certain segments of a trunk run.

Figure 5:
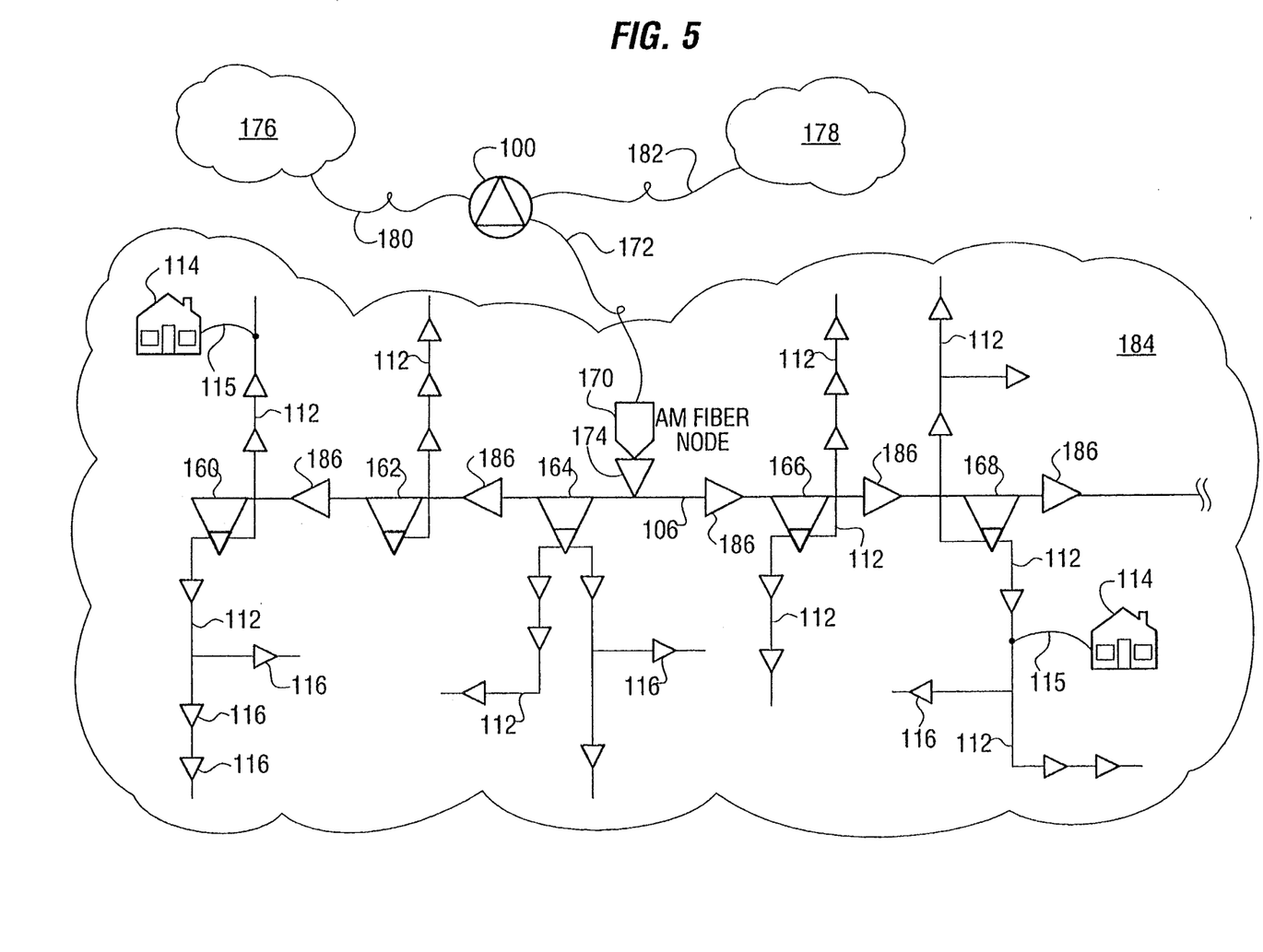
FIG. 5 is a system block diagram of a cable television system for distributing broadband cable television signals from a headend to a plurality of subscribers which is constructed in accordance with the invention illustrating a fiber to the service area architecture.

With respect now to FIG. 5, another type of reconfiguration which is advantageously accomplished with the bridger module 126 is shown. A multiplicity of subscribers which are already connected to distribution or bridger stations 160, 162, 164, 166, and 168 are grouped into a serving area 184. The serving area generally may include approximately 500 to 2500 subscribers and normally is geographically co-extensive. Previous trunk cable segments 106 connecting the trunk/bridger stations can be used between the new bridger stations 160, 162, 164, 166 and 168. Distribution amplifiers 186 are provided between the bridger stations 160–168 based on the loss structure of the trunk segment formed for the serving area.

To provide a broadband television signal to the service area thus formed, an AM fiber node 170 is provided. The headend 100 produces programming services in an RF signal format, similar to that described previously. The headend 100 converts the RF signals into an optical signal with an optical transducer-transmitter (not shown). The optical signal is transmitted over a fiber optic cable 172 to a fiber optic receiver (not shown) at node 270. There the optical signal is converted back to an RF signal and amplified by a distribution amplifier 174 before being fed to the trunk segment 106. It is noted that the high quality television signal produced by the AM fiber node 170 can be used to feed the trunk segment 106 in either direction. Because the bridger modules 126 are bidirectional, the bridger stations 160–168 may be on either side of the fiber node 170. Other service areas such as 176 and 178 may further be formed and fed by optical cables 180, 182 from the headend 100.

Figure 6:
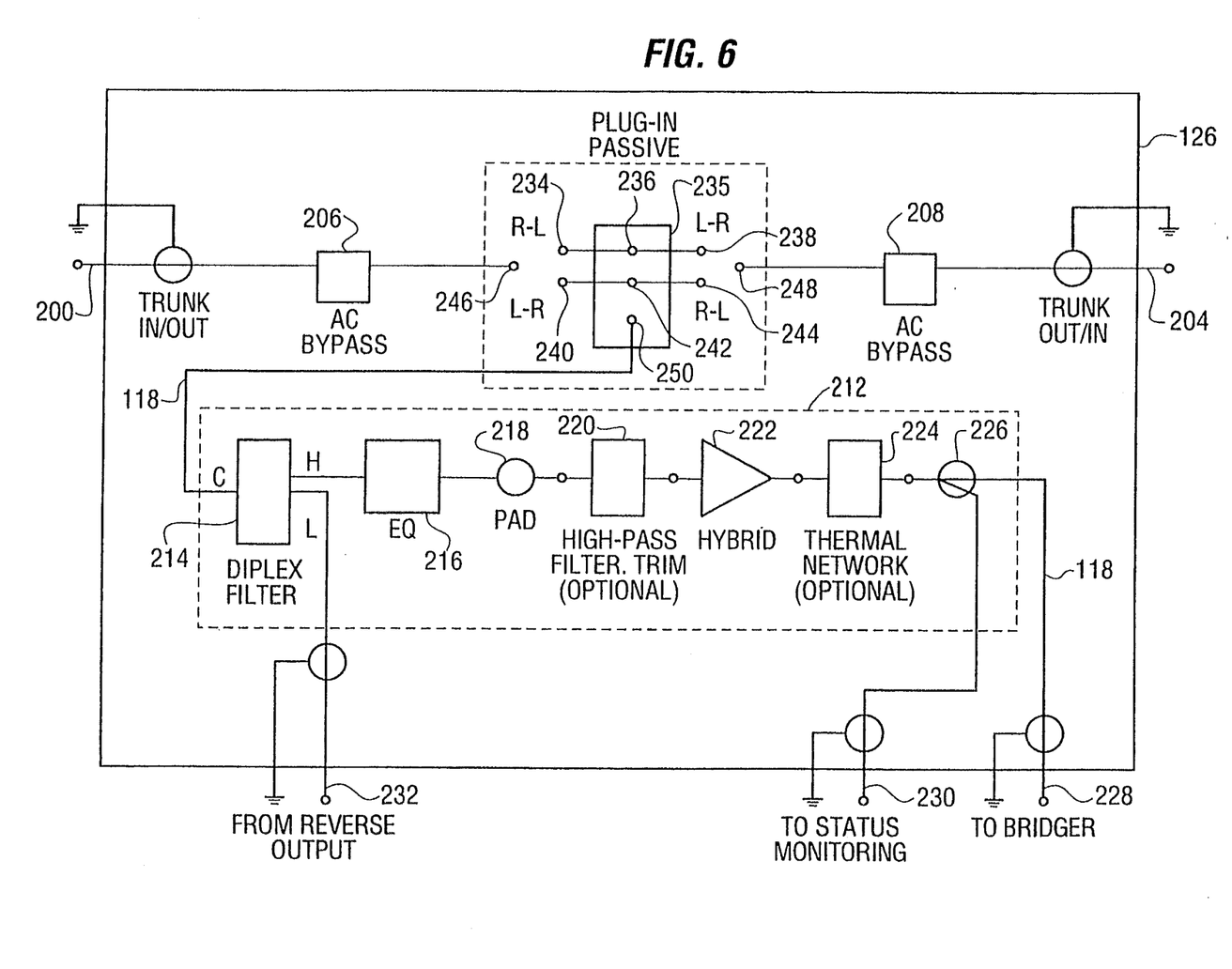
FIG. 6 is a block diagram of a bridger module which is utilized in the systems illustrated in FIGS. 4 and 5.

The bridger module 126 will now be described with respect to FIG. 6. The bridger module 126 operates to tap the coaxial trunk or trunk segment 106 in order to select a portion of the broadband television signal for the bridger amplifier at a bridger station and thus for the installed feeder network which is connected thereto. In the preferred embodiment of the bridger module 126, the circuitry of the module is contained on a single printed circuit board which is configured to replace the printed circuit board of the previous trunk amplifier on a pin by pin basis. The module 126 includes coaxial connections 200, 204, and 228 for a left side trunk IN/OUT connection, a right side trunk IN/OUT connection, and a bridger amplifier input connection, respectively.

The broadband television signal is passed in substantially unattenuated form by a through path of a signal director means 210, either right-to-left or left-to-right, from one of the input/outputs 200, 204 to the other input/output. An AC bypass circuit 206 blocks power carried on the coaxial cable from the signal director means 210 and reroutes it to connection 204, if the signal flow is from left-to-fight, while the AC bypass circuit 208 blocks power from the signal director means 210 and reroutes it to connection 200, if signal flow is from right-to-left. As the broadband television signal passes through the bridger module 126, a sample of the signal is tapped off of the main signal and diverted to the feeder signal line 118. The selected portion of the broadband television signal on the feeder line 118 is input to a conditioning circuit 212 before being output to the bridger amplifier input connection 228.

The conditioning circuit 212 provides for level setting and compensation functions for the selected portion of the broadband television signal before its output to the bridger amplifier input connection 228. The conditioning circuit 212 comprises an equalizer 216 for frequency compensation of the feeder signal and a pad 218 for setting the feeder signal input level to a hybrid amplifier 222. Additionally, if the standard equalization circuit produces insufficient frequency compensation, an optional high pass filter 220 and its associated trim circuitry can be provided. An optional thermal network 224 can be included in the conditioning circuitry 212, if the module is located in ambient conditions which require temperature compensation, mainly geographic areas of high temperature extreme. The high pass filter 220 and thermal network 224 are provided as plug-in modules. If these options are not selected their plug-in connections are jumpered together.

The conditioning circuit 212 may further contain elements which support communications and monitoring for a CATV system. A diplex filter 214 provides a coupling connection 232 from a reverse path amplifier (not shown) to complete a path for reverse path communications to the headend 100 of the system. The diplex filter 214 has a common connection C coupled to the output of the signal director means 210 and its high pass terminal H connected to the input of the equalizer 216. The low pass terminal L is connected to the coaxial connection 232 coupled to the output of the reverse signaling circuitry of the system. A directional coupler 226 is provided in the feeder signal line 118 to sample a portion of the feeder signal. The sampled portion of the feeder signal is output to the status monitoring circuitry of the system via a coaxial coupling connection 230. Conventionally, the status monitoring circuitry can communicate its information back to the headend 100 through the reverse path signaling system including diplex filter 214 and signal director 210.

The signal director means 210 comprises, in a preferred implementation, a first triple of plug-in terminals 234, 236, and 238 which are commonly connected and a second triple of plug-in terminals 240, 242, and 244 which are commonly connected. The triples are horizontally aligned such that the end terminals (234, 240 on one end and 238, 244 on the other) can be alternatively connected to plug-in terminals 246, 248 coupled to the outputs of the AC bypass circuits 206, 208, respectively. The center terminal 236, 242 of each triple is aligned vertically with a plug-in terminal 250 such that the a vertical row of three unconnected terminals is formed. A plug-in passive module 235 having mating pins with the vertical row is utilized to connect the triples and the feeder line 118 together, and jumpers are utilized to couple the triples to the trunk IN/OUT connections 200, 204 depending upon the direction of signal flow. The passive module 235 includes circuitry connecting the triples to the feeder line 118 in the form of selectable directional couplers or jumpers. The through loss to the feeder line 118 can the be selected based upon the location of the bridger module between the distribution amplifiers. The direction of signal flow is chosen by the jumpers connecting the triples to the terminals 246, 248. For a signal flow from left-to-right, terminals 246 and 250 are jumpered together on the left side of the signal director 210 and terminals 238 and 248 are jumpered together on the fight side of the signal director. For right-to-left flow, 246 and 234 are coupled together along with 244 and 248.

The bridger module 126 has two modes of operation, a first mode where it can e it can be used to terminate a trunk run. These modes can be used for either terminating a trunk cable run in a channel capacity upgrade or for terminating a trunk segment in a fiber to the service area architecture. In the intermediate mode of operation, a plug-in passive module 235 is plugged into signal director 212. For this mode, the plug-in passive can be a splitter (−3dB directional coupler), a −8 dB directional coupler, a −12 dB directional coupler, or any other value of through loss. The value of the plug-in passive is selected in accordance with the signal levels which occur as a result of the final placement of the bridger station in the reconfigured system. When the bridger module 126 is operating in the terminating mode, a jumper is used as the plug-in passive device.

The signal path through the signal director can be reversed to allow signal flow from either left-to-fight or fight-to-left along the trunk cable. For signal flow from left-to-right, the trunk signal enters the bridger module at trunk input connector and exits the module at trunk output connector. As the trunk signal passes through the module, a sample of the trunk signal is tapped off at signal director. For signal flow from fight-to-left, the signal path through the signal director is reversed. The trunk signal then enters the module at trunk input connector and exits the module at trunk output connector. Once again, a sample of the trunk signal is tapped off at the signal director. Signal flow can be reversed without physically reversing and resplicing the environmental housing of a trunk/bridger stations.

Figure 7:
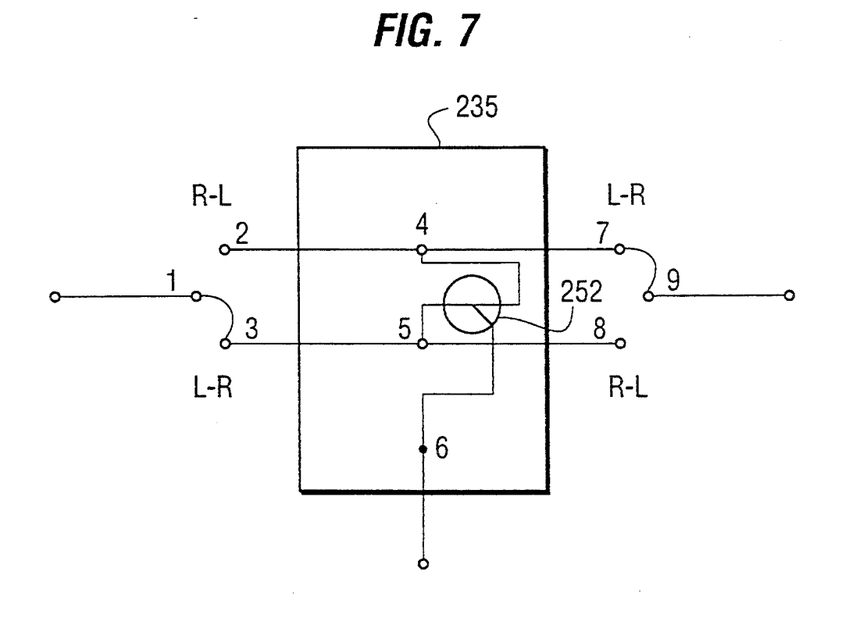
FIG. 7 is an electrical schematic diagram of a plug-in loss device incorporated into the signal director of the bridger module illustrated in FIG. 6 used in an intermediate configuration.
Figure 8:
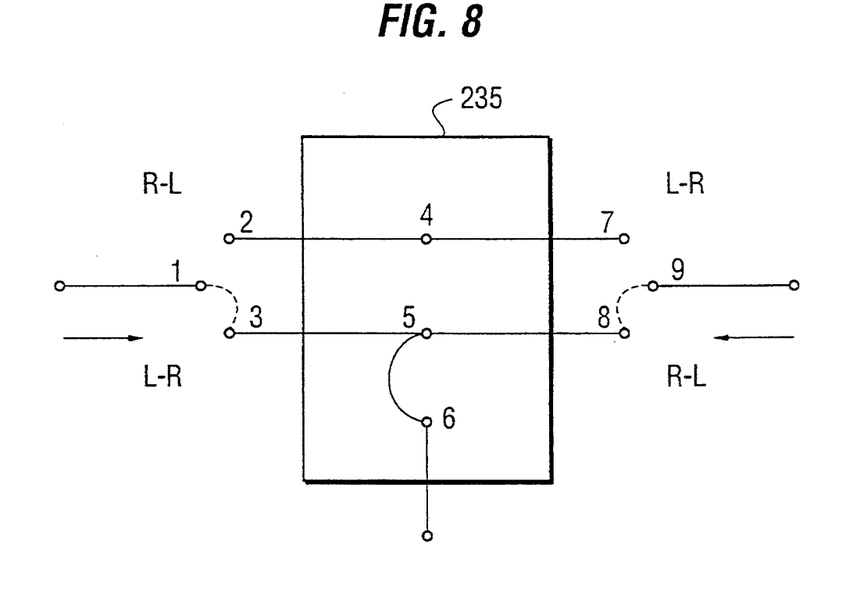
FIG. 8 is an electrical schematic diagram of the signal director of the bridger module illustrated in FIG. 6 used in a terminating configuration.

FIG. 7 is a schematic diagram of the signal director 210 which incorporates a directional coupler as the plug-in passive device. When the signal flow is from left to right, a substantially unattentuated signal through path is 1,3,5,4,7,9, respectively, and a substantially attenuated path is 1,3,5,6, respectively. If an −8 dB directional coupler is used, the signal level on the attenuated path 1,3,8,9 is −8 dB of the signal on the through path. If a −12 dB directional coupler is used, the signal level on the attenuated path. 1,3,8,9 is −12 dB of the signal on the through path. If a splitter (−3 dB directional coupler) is used, the signal level on the attenuated path 1,3,5,6 is equal to the signal level on the through path. When the signal flow is from right-to-left, the substantially unattenuated through-path is 9,8,5,4,2,1, respectively, and the substantially attenuated path is 9,8,5,6, respectively. Attenuation of the signal level occurs in the same manner as described above with reference to the left-to-right path.

By using plug-in passive modules 235 in the bridger module 126, signal loss levels which occur as a result of the upgrading of the cable television system can be compensated. This allows the bridger module 126 to be conveniently located at different locations along the trunk with respect to the distribution amplifiers. When the system is upgraded, the existing trunk/bridger stations can be maintained at their prior locations and new distribution amplifiers can be added at the necessary locations. Since the trunk amplifiers are removed from the trunk stations, compensation for signal loss along the trunk or trunk segment is provided by the distribution amplifiers. Changes in the loss structure of the system resulting from an increase in channel capacity are further compensated by incorporating the appropriate plug-in passive device into each bridger module.

Once a system has been reconfigured, and the bridger modules 126 have been incorporated therein, future upgrades can be accomplished in a relatively easy manner by selecting an appropriate plug-in passive and by adding distribution amplifiers at the necessary locations. The value of the passive plug-in to be used is selected in accordance with the distances of the bridger modules from the distribution amplifiers in the final configuration.

While there has been shown and described the preferred embodiments of the invention, it will be evident to those skilled in the art that various modifications and changes may be made thereto without departing from the spirit and scope of the invention as set forth in the appended claims. For example, although the present invention has been described with respect to a particular embodiment for upgrading a cable television system from 30–35 channels to 78 channels and for a fiber to the service area reconfiguration, the present invention should not limited to any particular increase in channel capacity or architecture. The invention is applicable to any type of CATV reconfiguration which can be accomplished without having to relocate trunk/bridger stations or bridger amplifier and feeder connections.

What is claimed is:

1. A broadband cable television system for delivering a broadband television signal from a headend to a plurality of subscribers comprising:
   a coaxial trunk cable for delivering the broadband television signal from the headend to trunk/bridger stations which are located along the trunk cable independently of the signal loss structure of the trunk cable;
   said trunk/bridger stations having a bridger amplifier providing a connection between said trunk cable and one or more feeders, said feeders delivering the broadband television signal from the trunk/bridger stations to subscribers;
   a plurality of amplifiers located along the trunk cable in accordance with the signal loss structure of the trunk cable to compensate for signal loss; and
   a circuit located at each trunk/bridger station for reversibly directing the broadband television signal in either direction through the trunk/bridger station from a first port to a second port without resplicing the trunk cable and for tapping at least a portion of said broadband television signal from said trunk cable and for coupling said portion to said bridger amplifier.

2. A broadband cable television system according to claim 1 wherein:
   said circuit located at each trunk/bridger station includes a plug-in passive device which directs signal flow along the trunk cable, wherein an attenuation of said plug-in passive device is selected in accordance with the location of the trunk/bridger station between said amplifiers 3. A broadband cable television system according to claim 1 wherein:
   said circuit located at each trunk/bridger station includes a plug-in signal director.

4. A broadband cable television system according to claim 3 wherein:
   each trunk/bridger station comprises a bridger amplifier and a bridger module and the circuit located at each trunk/bridger station is contained in said bridger module.

5. A broadband cable television system according to claim 4 wherein:
   said plug-in signal director includes an −8 dB directional coupler.

6. A broadband cable television system according to claim 4 wherein:
   said plug-in signal director includes a splitter.

7. A broadband cable television system according to claim 4 wherein:
   said plug-in signal director includes an −12 dB directional coupler.

8. A broadband cable television system according to claim 4 wherein:
   said plug-in signal director includes a jumper.

9. A bridger module for use in a broadband television system coupled to a trunk cable transmitting a broadband television signal, said bridger module comprising:
   a tap-off circuit for passing the broadband television signal being transmitted along the trunk cable through the bridger module and for tapping off a sample of the broadband television signal and routing the sample to subscribers; and
   a signal director circuit for reversibly directing the broadband television signal in either direction through said bridger module from a first port to a second port without resplicing the trunk cable.

10. A bridger module according to claim 9 wherein:
    said signal director circuit includes a plug-in signal director.

11. A bridger module according to claim 9 wherein:
    said signal director means includes a plug-in passive device which directs the broadband television signal flowing along the trunk cable, wherein an attenuation of said plug-in passive device is selected in accordance with signal loss levels of said trunk cable.

12. A bridger module according to claim 11 wherein:
    said plug-in passive device is an −8 dB directional coupler.

13. A bridger module according to claim 11 wherein:
    said plug-in passive device is a splitter.

14. A bridger module according to claim 11 wherein:
    said plug-in passive device is a −12 dB directional coupler.

15. A bridger module according to claim 11 wherein:
    said plug-in passive device is a jumper.

* * * * *